United States Patent [19]
Yu et al.

[11] Patent Number: 6,147,467
[45] Date of Patent: Nov. 14, 2000

[54] DYNAMIC COMPENSATOR FOR USE IN SERVO LOOP FOR OPTICAL PICKUP HEAD

[75] Inventors: Wen-Hai Yu; Shih-Chieh Lee; Chih-Chen Chen, all of Taipei, Taiwan

[73] Assignee: Asustek Computer, Inc., Taipei, Taiwan

[21] Appl. No.: 09/377,981

[22] Filed: Aug. 20, 1999

[30] Foreign Application Priority Data

Dec. 14, 1998 [TW] Taiwan ................................. 87120765

[51] Int. Cl.[7] ................................................ G05B 13/00
[52] U.S. Cl. .......................... 318/561; 318/560; 318/632
[58] Field of Search .................................... 318/561, 560, 318/611–618, 632, 592, 569; 364/141, 142, 161; 369/44.11; 361/236, 242

[56] References Cited

U.S. PATENT DOCUMENTS

| | | | |
|---|---|---|---|
| 3,917,930 | 11/1975 | Davey et al. ........................... | 235/151 |
| 4,396,975 | 8/1983 | Kurakake ................................ | 364/161 |
| 4,494,202 | 1/1985 | Yueh ...................................... | 364/462 |
| 5,087,866 | 2/1992 | Smith .................................... | 318/653 |
| 5,189,620 | 2/1993 | Parsons et al. .................... | 364/431.02 |
| 5,331,296 | 7/1994 | Davis ................................... | 331/158 |
| 5,808,978 | 9/1998 | Wang et al. ........................ | 369/44.28 |

*Primary Examiner*—David Martin
*Assistant Examiner*—Rita Leykin
*Attorney, Agent, or Firm*—Majestic, Parsons, Siebert & Hsue P.C.

[57] ABSTRACT

A servo loop, including a dynamic compensator, for use in an optical disk player is provided. The optical disk player reproduces data over the optical disk. The pickup head reads data on a data track of the optical disk and generates a feedback signal. The dynamic compensator inputs a feedback signal and outputs a compensation signal after a predetermined transfer function operation over the feedback signal in order to adjust the dynamic response of the servo loop. The servo loop includes a switch, which is responsive to a signal indicative of high spinning rate of the optical disk for selectively outputting the compensation signal. The servo loop includes a device coupled to the switch for selectively transmitting the compensation signal into the servo loop.

11 Claims, 6 Drawing Sheets

DYNAMIC COMPENSATOR FOR USE IN SERVO LOOP FOR OPTICAL PICKUP HEAD

FIELD OF INVENTION

The present invention relates to an electronic-type dynamic compensator used in a servo loop for the optical pickup head of an optical disk player, i.e. CD-ROM, CD-player, CD-R, CD-RW, DVD-ROM and DVD-player. The servo loop is used in servo-controlling for the in-track-following operation and/or track searching operation of the pickup head.

BACKGROUND OF INVENTION

The following technical information may be further referred to in order to have an in-depth understanding of the background and prior art technology regarding the invention.

1. International Standard ISO/IEC 10149, first edition, 1989–09–01, Global Engineering Documents, Irvine, Calif. 92714, USA.
2. Small Form Factor Committee, Specification of ATA Packet Interface for CD-ROM's, SFF-8020, Revision 1.2, Feb. 24, 1994.
3. SCSI-2 draft proposed American National Standard, Revision 10c.
4. Red book, Compact Disc—Digital Audio(CD-DA), by Sony Corp. and Philips N.V., April 1987.
5. Yellow book, Compact Disc—Read Only Memory (CD-ROM), by Sony Corp. and Philips N.V., Nov. 1988.

The request for higher data access rate over the optical disk demands a higher disk player operation speed. As a result, the servo control to the optical pickup head becomes a major issue while designing the disk player. It is well known that there are multiple distinctive servo loops employed in the disk player to perform data reproduction operation by guiding the laser beam over the data track through the track-search, in-track-following and focus operations. The prior art servo control system for the optical disk player includes the U.S. Pat. Nos. 4,485,337, 4,783,774, 5,289,097, 5,246,479, 5,257,252, 5,345,347 and 5,808,978.

The Red Book mentioned above requires the pitch of disk data tracks to be 1.6 $\mu$m and the in-track-following error of the optical pickup head must be within 0.1 $\mu$m to assure a normal data read/write operation. Furthermore, the allowable eccentricity is +200 $\mu$m and –200 $\mu$m. Taking the disk with 120 mm diameter as an example, the allowable traverse distance for the pickup head during data access operation is 3.5 cm. In order to achieve the long distance movement and precision positioning requirements for the pickup head, typical pickup head is controlled by a dual-actuator system. That is, one in-track-following actuator is responsible for in-track-following operation, which is in nature of high frequency and short distance movement, and another actuator is responsible for search track operation which is in nature of low frequency and long distance movement. Despite the operation speed, the servo control for the in-track-following operation must always overcome the existing eccentricity of the disk and/or the physical damage over the surface and, at the same time, keep the in-track-following error within the allowable range (0.1 $\mu$m).

Referring to FIG. 1, the mechanical and electrical components of a typical disk drive system include a head/disk assembly (HDA) having therein actuator 11, which preferably includes a radial coil, a focus coil and an actuator motor, which positions the pickup head 12 to different radial positions relative to the surface of the disk 13. The HDA also includes read preamplifier circuit 18 for amplifying the data and servo information from the disk surface, e.g. the position and velocity signal. The read preamplifier circuit 18 also contains a read buffer for supplying read data from the particular track selected for reading. The digital signal processor (DSP) 19 receives the analog read data from the read preamplifier circuit 18. As known in the arts, the DSP 19 includes a read channel analog filter which supplies the analog signal to a pulse detector (not shown). The output of the pulse detector is supplied to a data separator (not shown) as raw digital read data. The servo controller 15 and DSP 19 interface with a microprocessor 10 through a bus 102 which carries address, control and data information. The servo controller 15 detects and processes servo information from disk 13 concerning the servo burst, sync pulse and track ID and in-track-following error. The servo controller 15 connects to the microprocessor 10 through bus 102 and controls the flow of information concerning the servo read timing and control data. The servo controller 15 also includes analog/digital and digital/analog converters. The analog output 151 from servo controller 15 is supplied as an input to the actuator drive circuit 90. The actuator drive circuit 90 includes power amplifier control circuitry which supplies an actuator drive signal to a power amplifier which in turn supplies control current to the actuator 11. The system depicted also includes a spindle motor control drive circuitry 14 for controlling the spindle motor 16 for rotating optical disk 13. The system further includes a host computer interface 17, which provides control and information paths through a bus 171 between a host computer and the elements shown. A buffer memory 93 is provided to accommodate difference in data transfer rate between the host interface 17 and the host computer, and that between the host interface 17 and the disk 13. In other words, the buffer memory 93 temporarily stores the video/audio information read from the disk 13. The DSP 19 also provides a feedback signal 191 into a motor speed control circuit 91, which compares the feedback signal 191 with a signal 101 from the microprocessor 10. The result of comparison provides an indication of whether the motor is spinning too fast or too slow at the present time with respect to the data transfer rate. This result is used to control the spindle motor control drive circuitry 14, which provides power to the spindle motor 16. The device 92 is a digital/analog converter and the output of the amplifier device 94 is an audio signal.

Referring to FIG. 2, the optical pickup head 12 is movably supported on a feeder 21. The feeder 21 is driven by the actuator 11 in a well known manner so that optical pickup head 12 moves radially in reference to the surface of the optical disk 13. The optical pickup head 12 includes a carriage 121, a source of a light beam, e.g. a semiconductor laser device 122, a collimator lens 123, a semi-transparent mirror 124, a device for placing a laser beam on the optical disk 13, e.g., an objective lens 125, a split photosensor 126, an in-track-following actuator 127 and a focusing actuator 128. The laser device 122 radiates the laser beam. The collimator lens 123, the semi-transparent mirror 124 and the objective lens 125 guide the laser beam to the optical disk 13 so that the laser beam is placed on the optical disk 13 in a form of light spot. The optical pickup head 12 then scans concentric tracks of the optical disk 13 one after another or a spiral track of the optical disk 13 with the light spot of the laser beam moving in radial direction during the disk information reproduction operation. The laser beam is reflected by the optical disk 13 and then applied to the split photosensor 126 through the objective lens 125 and the semi-transparent mirror 124. The split photosensor 126 detects from the reflected laser beam information data responding to a state, e.g., a strength of the reflected laser beam, and produces an electrical signal responding to the information. The objective lens 125 is movably mounted on the carriage 121 of the optical pickup head 12. The in-track-following actuator 127 controls position of objective lens 125 in the radial direction of the disk 13 so that the light spot of the laser beam follows a center of a prescribed track. The tracking control of the objective lens 125 may be made by a conventional tracking control system. The focusing actuator 128 controls the position of objective lens 125 in the perpendicular direction to the surface of the optical disk 13 so that the light spot of the laser beam is accurately focused on a prescribed track. The focusing control of the objective lens 125 may be made by a conventional focusing control system.

The mathematical model for the optical pickup head may be represented by a spring-mass-damping system over a carrying slider shown in FIG. 3. M, K, and C respectively denote the equivalent mass, spring constant and viscosity of the system concerning the optical pickup head. FIG. 4 shows the corresponding control loop system over the optical pickup head within the system shown in FIG. 1. The position signal 44 output from the pickup head 43 is subtracted from the in-track-following reference signal 42 by the subtraction node 45. The deviation signal 46 output from the subtraction node 45 is input to the servo controller 41 for amplifying purpose. After amplification, an operation amount signal 48 is generated by the servo controller 41 to control the in-track-following movement of the pickup head 43.

The servo control shown in FIG. 1 and FIG. 4 has the following problems.

As the spindle motor 16 proceeds with a higher spin speed to overcome the eccentricity of the optical disk 13, one must escalate the gain of the servo controller 15. However, as the gain of the servo controller 15 is increased, the actuator 11 becomes easily saturated and the phase margin decreases accordingly.

A run-out cancellation technology, conventionally used to cancel the negative effect over the in-track-following operation caused by the eccentricity of data track of optical disk and shown in FIG. 5, is introduced in the following. The negative effect is especially significant when the spin frequency of the disk is relatively larger.

The first step of the run-out cancellation technology is to measure the eccentricity of the disk at a predetermined spin speed before data reproduction operation is performed by the pickup head 55. Afterwards, a corresponding calibration value is stored within system memory. The signal 57 in FIG. 5 is the position signal.

As shown in FIG. 5, the servo control loop involved additionally includes a run-out cancellation circuit 51 of feed forward property. At any time, the run-out cancellation circuit 51 which has memory storing the calibration value, responsive to the in-track-following reference signal 52, outputs a corresponding cancellation signal 50 to the summation node 56 to counterbalance the eccentricity of the optical disk Therefore, at high spin frequency, the servo controller 53 only needs to output an output signal 58 of low gain that is added to the cancellation signal 50 to generate an operation amount signal 59 of high gain to the pickup head 55.

This approach, at high spin frequency, is capable of lowering the request for high gain signal from the servo controller 53. However, the major drawback is the necessity of measuring the eccentricity value of the disk at a predetermined spin speed before each data reproduction operation is performed in order to obtain a corresponding calibration value. In addition, the calibration value takes up memory space. The aforementioned is the first issue.

It is known the undamped natural frequency of the system is proportional to the equivalent spring constant K of the system. The undamped natural frequency of the system must be large enough, or, in other words, K value must be large enough, to resist the serious vibration of the optical pickup head 12 caused by the search track operation performed during high spinning speed of the spindle motor 16. To the other end, as the K value is too large, the surface scratch handling capability of the optical pickup head 12 will be lowered during low spinning speed of the spindle motor 16 and which is not desirable. A center servo technology that aims to lower the serious vibration of the optical pickup head caused by search track operation at high spinning speed and shown in FIG. 6 is introduced in the following. The serious vibration of this kind may result in the failure of the servo control system.

In FIG. 6, the servo loop involved includes a center servo circuit 65 which inputs the position signal 162 from the optical pickup head 63 and outputs a centering signal 64.

To prevent the servo system failure, as the microprocessor 10 instructs the optical pickup head 63 perform long distance search track operation, the microprocessor 10 at the same time issues an enabling signal that turns on the switch 69. In response to the operation of the long distance search track operation of the optical pickup head 63, the switch 69 is turned on and the centering signal 64 is applied to the summation node 67. Concurrently, the microprocessor 10 forces the servo controller 61 outputting a null signal. The signal 68 of high gain output from the summation node 67 forces the in-track-following actuator 127 to follow immediately. This action allows the in-track-following actuator 127, at any time, to keep in the equilibrium state relative to the feeder 21 and prevents the patting of the lens 125 over the carriage 121.

The center servo technology improves the stability issue of the optical pickup head 63 when the search track operation is performed at high spinning speed. Nevertheless, it can not prevent the impact over the servo control caused by the eccentricity of the optical disk.

SUMMARY OF INVENTION

The major objective of the present invention is to solve the conventional problems of disk eccentricity and the serious vibration of the optical pickup head caused by search track operation at high spinning speed.

A servo loop for use in an optical disk player including a dynamic compensator is provided. The optical disk player reproduces data over the optical disk. The pickup head reads data on a data track of the optical disk and generates a feedback signal.

The dynamic compensator inputs a feedback signal and outputs a compensation signal after a predetermined transfer function operation over the feedback signal in order to adjust the dynamic response of the servo loop.

The servo loop includes a switch which is responsive to a signal indicative of high spinning rate of the optical disk for selectively outputting the compensation signal.

The servo loop includes a device coupled to the switch for selectively transmitting the compensation signal into the servo loop.

BRIEF DESCRIPTIONS OF APPENDED DRAWINGS

DETAILED DESCRIPTIONS OF THE PREFERRED EMBODIMENT

Figure 7:
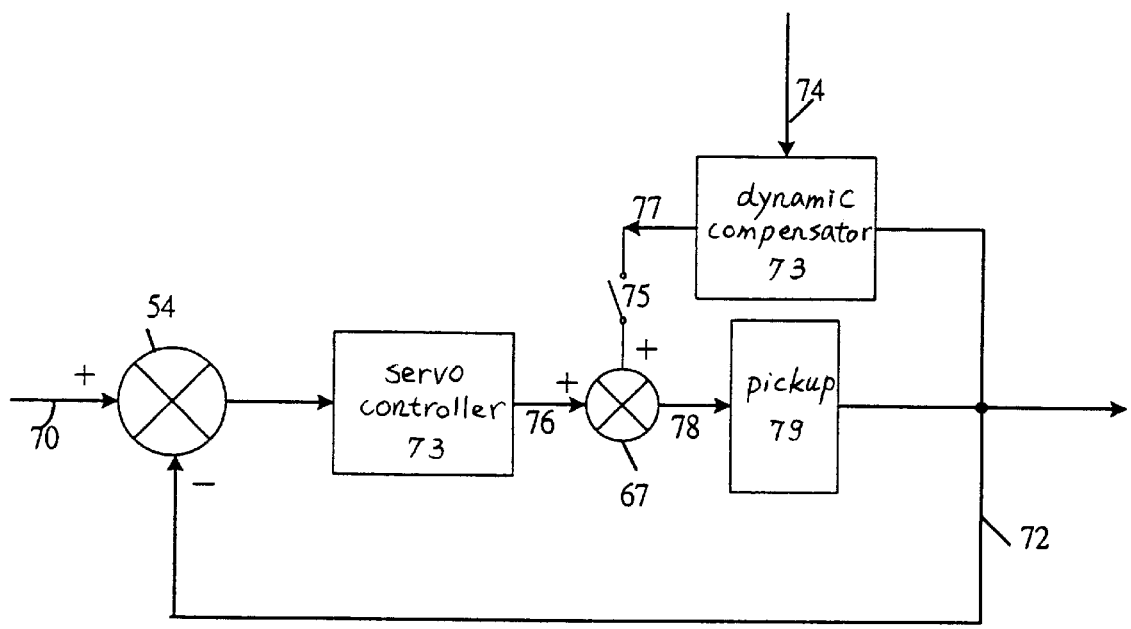
FIG. 7 shows the control loop of the present invention.

The invention provides an electronic-type dynamic compensator 73, as shown in FIG. 7, for use in the servo control loop for a pickup head which solves two kinds of aforementioned drawback. The in-track-following reference signal 70 and the position signal 72, that is output from the pickup head 79, are input to the subtraction node 54, and the subtraction node 54 outputs a deviation signal to the servo controller 71. The frequency shift signal 74 will be recited later on.

Figure 1:
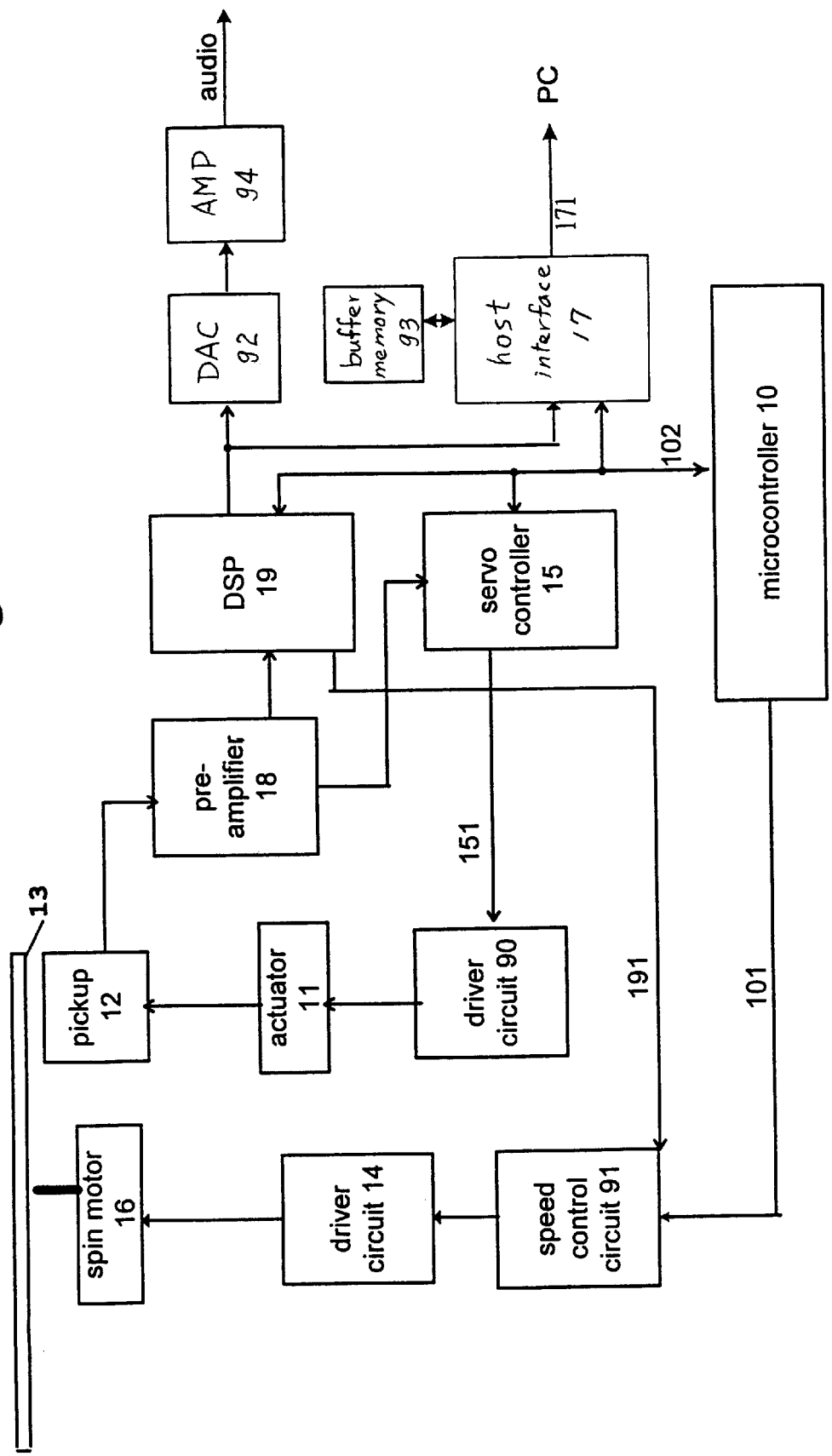
FIG. 1 shows mechanical and electrical components of a disk system in which the present invention may be employed.
Figure 2:
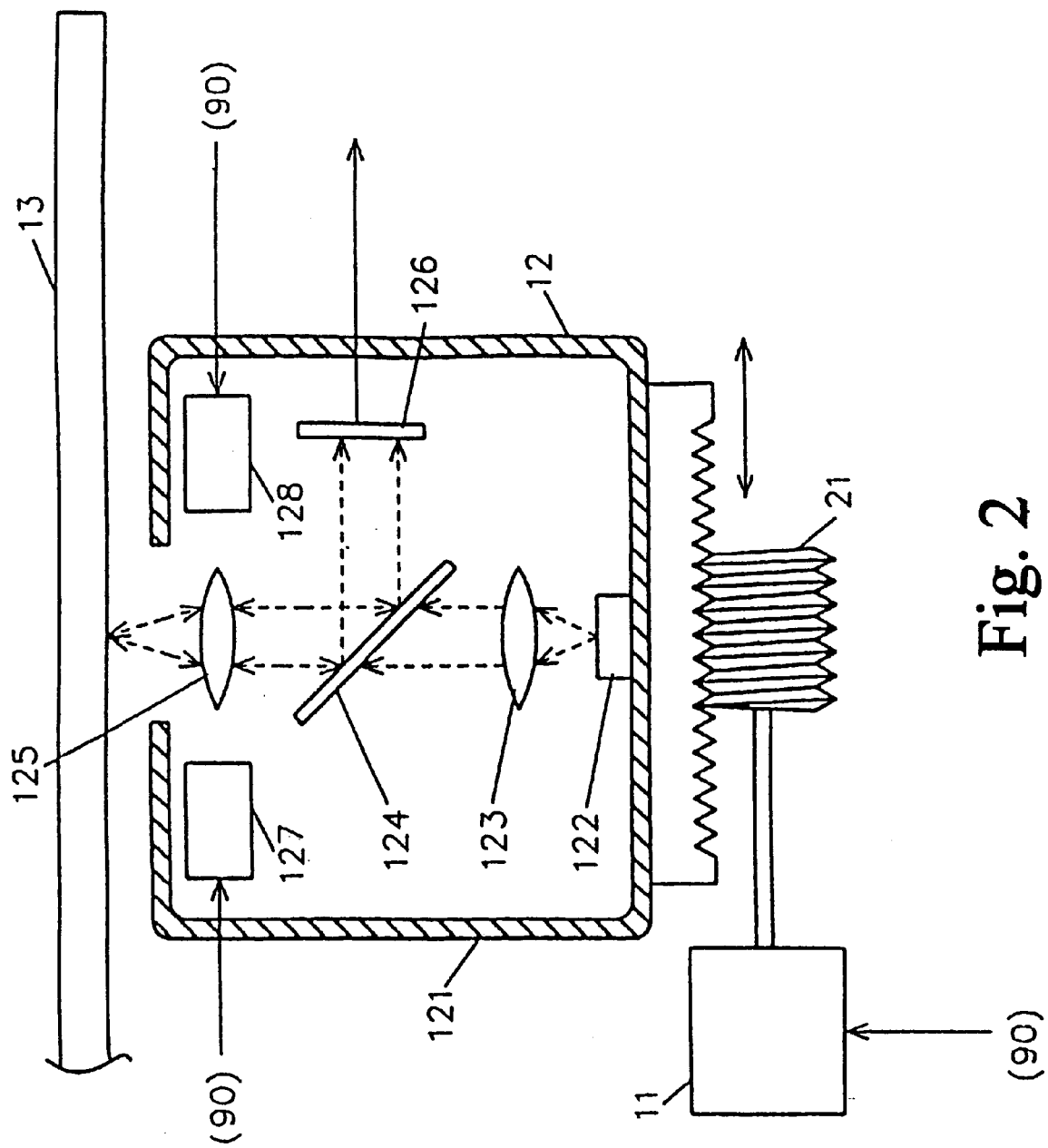
FIG. 2 shows a detailed construction of a typical pickup head.
Figure 3:
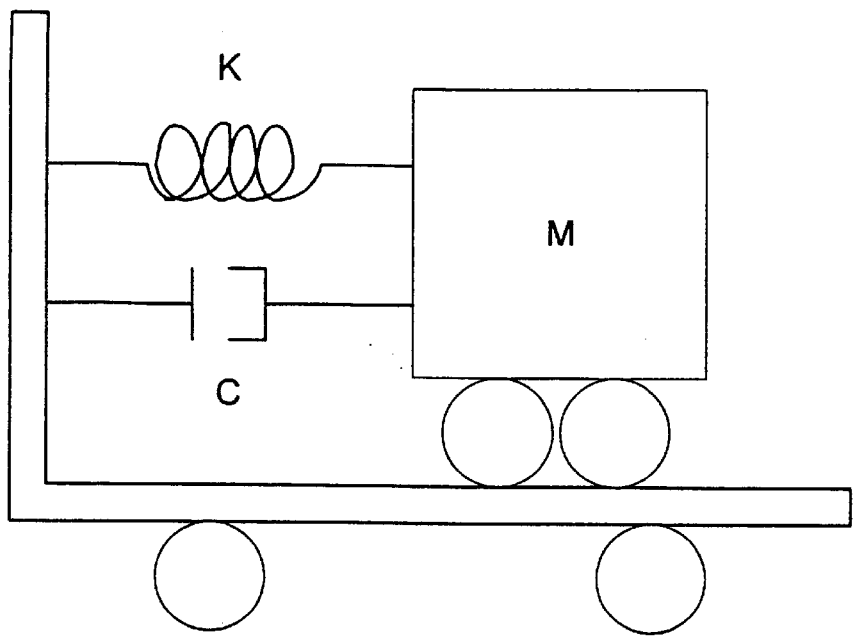
FIG. 3 shows the mathematical model of an optical pickup head.
Figure 4:
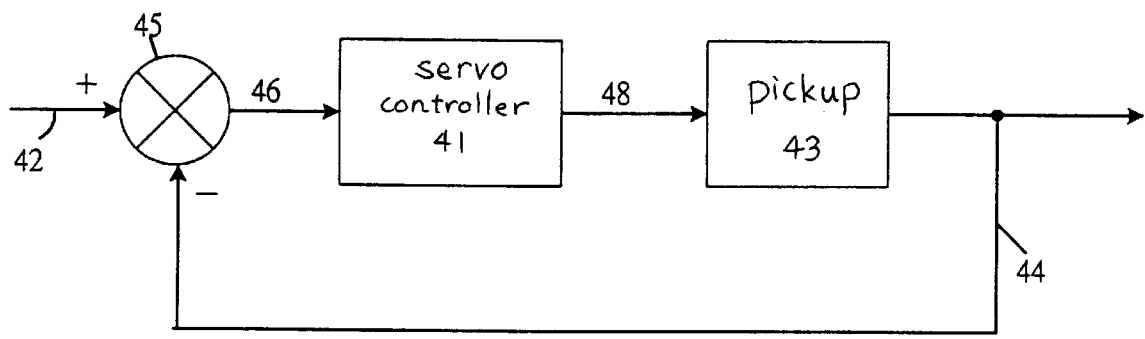
FIG. 4 shows the control loop for the optical pickup head within a conventional optical disk player.
Figure 5:
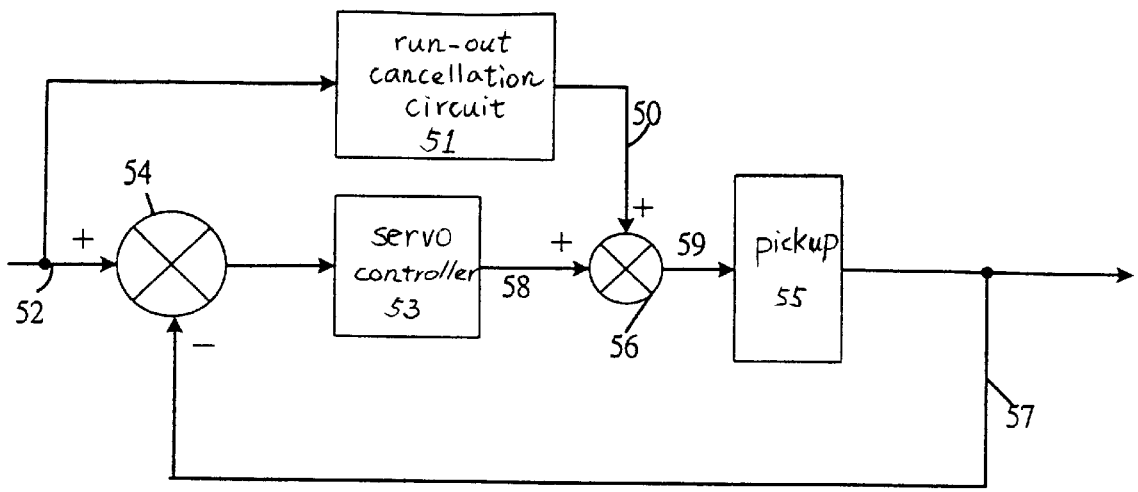
FIG. 5 shows a control loop used in the run-out cancellation approach.
Figure 6:
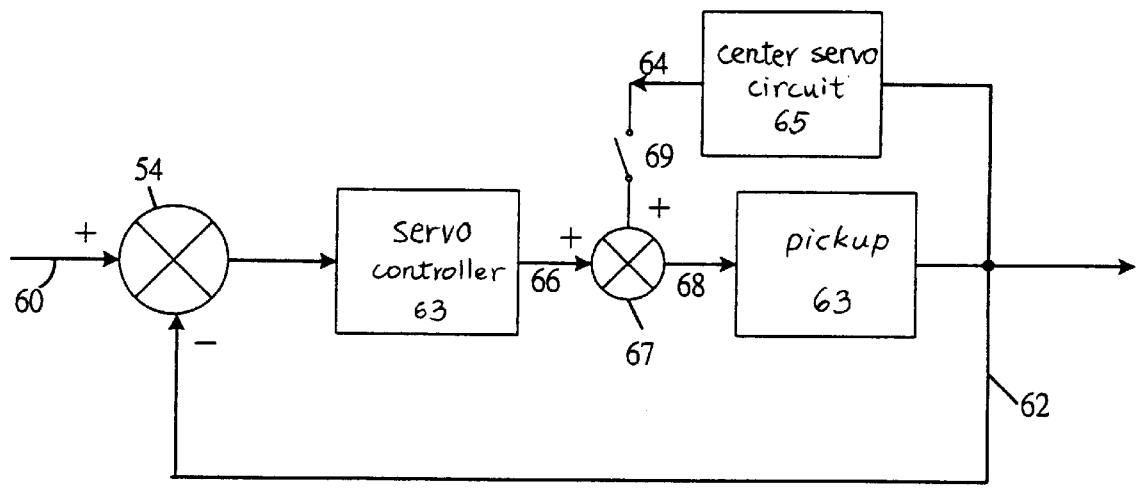
FIG. 6 shows a control loop used in the center servo approach.

Compared with the conventional servo loop shown in FIG. 4, the dynamic compensator 73 inputs the position signal 72 and outputs a compensation signal 77 based on a predetermined transfer function. The predetermined transfer function may be a second-order filter function or a third-order filter function or like type. In the following, the second-order filter function is employed. As the microprocessor 10 issues a high spinning activation signal and the spindle motor 16 proceeds a high speed spinning, the high spinning activation signal turns on the switch 75. Notwithstanding the servo controller 71 issues a signal 76 of smaller gain, due to the compensation signal 77 being input to the summation node 67, the summation node 67 outputs a signal 78 of high gain to the pickup head 79. The equivalent mass, spring constant and viscosity of the system facing the servo controller 71 changed and therefore the dynamic response of the system changed accordingly. The overall dynamic response of the system results from the loading effect of the optical pickup head 79 plus the electronic-type dynamic compensator 73. Through suitable designation of the pole-zero frequency of the second-order transfer function, one can obtain a desirable system dynamic response. As well known in the arts, the zero point frequency is a frequency value at which the filter transfer function value is a relative smallest. Also, the pole point frequency is a frequency value at which the filter transfer function value is a relative largest.

Through the selection of a second-order or third-order filter transfer function embodied within the electronic-type dynamic compensator 73, one could tune the resonant frequency of the optical pickup head 79 close to or substantially equal to the nominal spin frequency of the disk player. Furthermore, adequate damping ratio can also be obtained through the selection of the second-order or third-order filter transfer function such that the dynamic response of the optical pickup head 79 at the nominal spin frequency has higher gain than the conventional approach. As an example, the gain of one conventional approach at the nominal spin frequency is 39 dB and the gain of the present invention at the nominal spin frequency is 55 dB, shown in FIG. 8. As the result, the invention counterbalances the effect of eccentricity of the optical disk by escalating the gain at the nominal spin frequency.

The undamped natural frequency is substantially equal to the resonance frequency. Therefore, as the resonance frequency is increased to the nominal spin frequency, the undamped natural frequency increases accordingly. As the result, the system's equivalent spring constant increases. This higher equivalent spring constant reduces the shaking of the pickup head caused by the search track operation when the spin frequency is high.

During low spin frequency, since the switch 75 is turned off and the compensation signal 77 is not input to the summation node 67, the system's equivalent spring constant does not change at all. Therefore, the system can easily take care of the surface scratch issue.

Figure 8A:
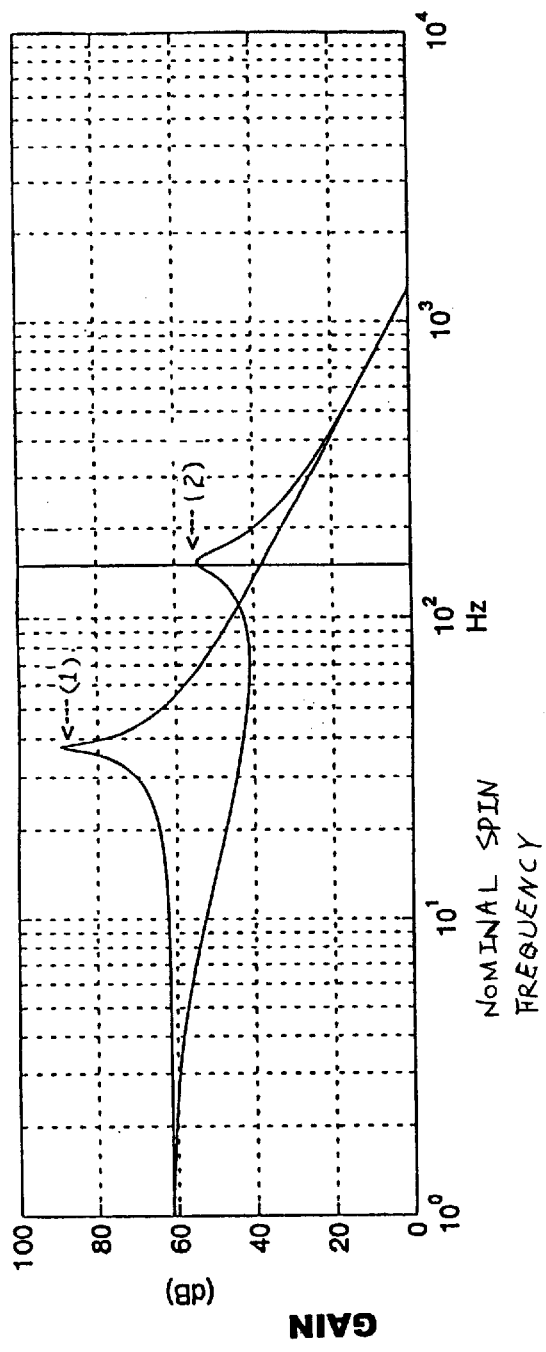
FIG. 8(A) shows the relationship of the gain to the spin frequency with regard to be invention and conventional approach.
Figure 8B:
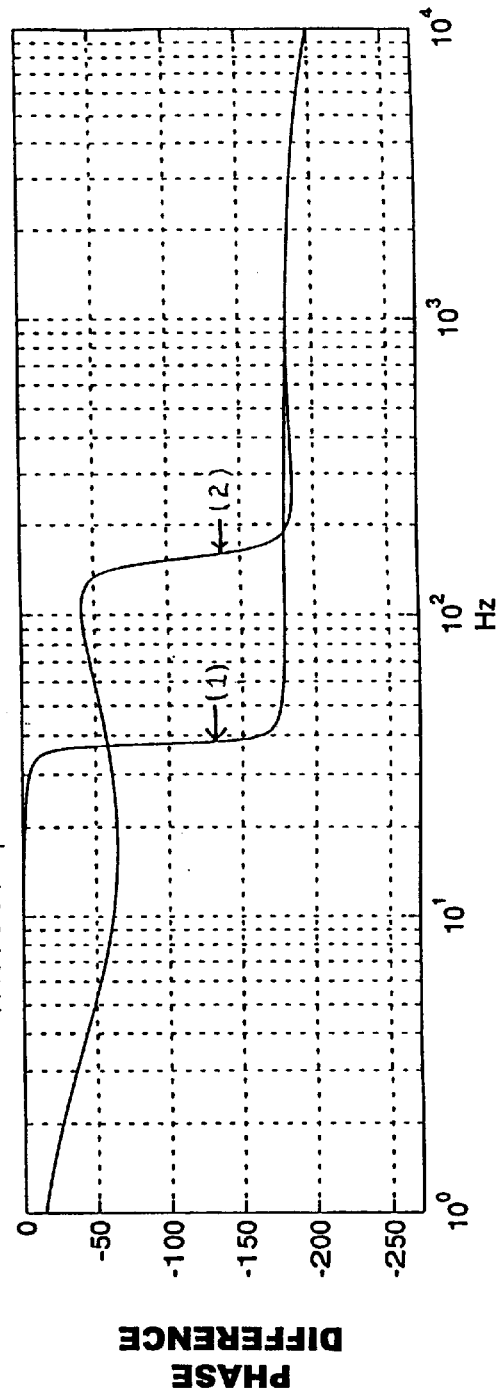
FIG. 8(B) shows the relationship of the phase difference to the spin frequency with regard to the invention and conventional approach.

FIG. 8(A) and 8(B) together show the system dynamics response of the invention, compared with the conventional one, through mathematical modeling. FIG. 8(A) shows the relationship of the gain to the spin frequency and FIG. 8(B) shows the relationship of the phase difference to the spin frequency. Numeral (1) in the figure corresponds to the system dynamics response of a conventional system and numeral (2) in the figure corresponds to the system dynamics response of a system employing control loop as shown in FIG. 7.

It can be seen from FIG. 8(A) that after the adjustment and/or compensation of the parameters in the second-order filter function of the electronic-type dynamic compensator 73 are performed, the resonant frequency of optical pickup head falls within region near the nominal spin frequency of the optical disk. Also the gain at the nominal spin frequency is higher than that corresponding to the conventional approach. The invention effectively compensates the negative effect caused by the eccentricity of the disk during in-track-following operation of a high spinning disk.

In summary, regardless of high-speed spinning or low-speed spinning, the electronic-type dynamic compensator provided by the invention solves the issues of eccentricity and surface scratch respectively, and therefore maintains the in-track-following error within the 0.1 μm aforementioned. During search track operation of a high spinning disk, the invention also prevents the shaking phenomenon of the optical pickup head.

Most of the prior art disk players adopt the constant angular velocity (CAV) methodology for the speed control during high-speed operation period. In other words, the angular spinning rate is kept at a constant value. The invention as recited above is applicable in the CAV environment.

On the contrary, for a disk player adopting the constant linear velocity (CLV) methodology for the speed control during high speed operation period, the angular spinning rate corresponding to the inner-track is higher than that corresponding to the outer-track. As such, in addition to the high spinning activation signal that selectively turns on the switch 75, a frequency shift signal 74 to the spindle motor is also input to the electronic-type dynamic compensator 73 to activate the electronic-type dynamic compensator 73. In other words, for inner-track data reproduction, the dynamic compensator 73 is activated, and, for outer-track data reproduction, the dynamic compensator 73 is de-activated. Through this arrangement, under the CLV environment, the instant invention also achieves the expected dynamic response shown in FIG. 8.

The invention has been described with reference to the drawings shown in figures and the preferred embodiment recited above. However, it is to be understood that above recitation is illustrative rather than limiting. Therefore, equivalent modifications and/or replacements are possible and still within the intended scope of protection of the invention as defined by the following claims.

For instance, although the position signal is used as an example of the feedback signal, feedback signal of other types, i.e. a velocity signal or an acceleration signal, may also be used without departing from the spirit of the invention. Furthermore, other filter transfer functions similar to the mentioned second-order or third-order may be used in the dynamic compensator in the invention to achieve the objective of the invention.

What is claimed is:

1. A servo loop for use in an optical disk player, said optical disk player reproducing data over an optical disk, comprising:

a pickup head for reading data on a data track of the optical disk and generating a feedback signal;

a dynamic compensator, inputting the feedback signal and outputting a compensation signal after a predetermined transfer function operation over the feedback signal, for adjusting the dynamic response of the servo loop;

a switch, responsive to a signal indicative of high spinning rate of the optical disk, for selectively outputting said compensation signal;

means, coupled to the switch, for selectively inputting said compensation signal into the servo loop.

2. The servo loop as recited in claim 1, wherein the predetermined transfer function is a second-order transfer function.

3. The servo loop as recited in claim 1, wherein said means is a summation node, the summation node includes a first terminal inputting said compensation signal, the summation node includes a second terminal inputting a small gain signal.

4. The servo loop as recited in claim 3, further comprising a servo controller, responsive to a deviation signal, for outputting said small gain signal.

5. The servo loop as recited in claim 4, further comprising a subtraction node, the subtraction node includes a first terminal inputting the feedback signal, the subtraction node includes a second terminal inputting an in-track-following reference signal, the subtraction node outputting the deviation signal.

6. The servo loop as recited in claim 1, wherein the dynamic compensator is activated responsive to a frequency shift signal.

7. The servo loop as recited in claim 1, wherein as the optical disk player is in high spinning operation mode, a constant-angular-velocity speed control is performed.

8. The servo loop as recited in claim 6, wherein as the optical disk player is in high spinning operation mode, a constant-linear-velocity speed control is performed, and wherein the frequency shift signal is generated as the spinning frequency is shifted.

9. The servo loop as recited in claim 1, the feedback signal is a position signal.

10. The servo loop as recited in claim 1, wherein the feedback signal is a speed signal.

11. The servo loop as recited in claim 1, wherein the predetermined transfer function is a third-order transfer function.

* * * * *